United States Patent
Koh et al.

(10) Patent No.: US 9,390,465 B2
(45) Date of Patent: Jul. 12, 2016

(54) IMAGE RESIZING METHOD, IMAGE TRANSMISSION METHOD, AND ELECTRONIC DEVICE

(75) Inventors: Byunggul Koh, Seoul (KR); Seongab Kim, Seoul (KR); Seongpyo Hong, Seoul (KR); Bumhyeon Baek, Seoul (KR); Sang Hyuk Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 742 days.

(21) Appl. No.: 13/183,027

(22) Filed: Jul. 14, 2011

(65) Prior Publication Data

US 2012/0287164 A1    Nov. 15, 2012

(30) Foreign Application Priority Data

May 11, 2011    (KR) .......................... 10-2011-0043746

(51) Int. Cl.
*G06T 3/40*     (2006.01)
*G06T 11/60*    (2006.01)
*G06T 3/00*     (2006.01)

(52) U.S. Cl.
CPC .................................... *G06T 3/0012* (2013.01)

(58) Field of Classification Search
CPC .......... G06T 3/40; G06T 11/60; G06T 3/0481
USPC ........................................................ 345/667
See application file for complete search history.

(56) References Cited

U.S. PATENT DOCUMENTS

| | | | | |
|---|---|---|---|---|
| 6,011,872 | A * | 1/2000 | Qian et al. ..................... | 382/243 |
| 7,230,648 | B2 * | 6/2007 | Ueno ............................. | 348/340 |
| 2003/0006995 | A1 * | 1/2003 | Smith et al. .................. | 345/671 |
| 2007/0255792 | A1 * | 11/2007 | Gronberg ..................... | 709/206 |
| 2010/0289937 | A1 * | 11/2010 | Hada ......................... | 348/333.01 |
| 2012/0281119 | A1 * | 11/2012 | Ohba et al. ................ | 348/240.2 |

FOREIGN PATENT DOCUMENTS

KR    10-2010-0130670 A    12/2010

* cited by examiner

*Primary Examiner* — Ming Hon
*Assistant Examiner* — Shivang Patel
(74) *Attorney, Agent, or Firm* — Birch, Stewart, Kolasch & Birch, LLP

(57) ABSTRACT

An image resizing method including obtaining an original image including a peripheral region and a core region, the core region including a target image; obtaining a resized image including the entire core region and part of the peripheral region, the image being resized according to a priority; and displaying the resized image.

20 Claims, 13 Drawing Sheets

FIG. 8
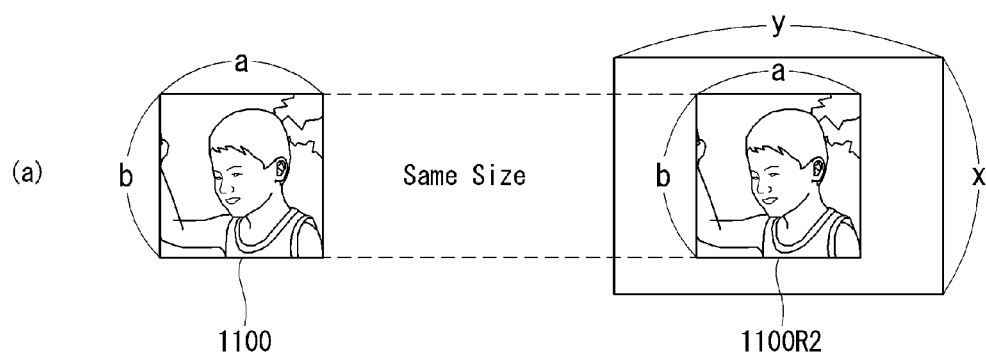
(a)
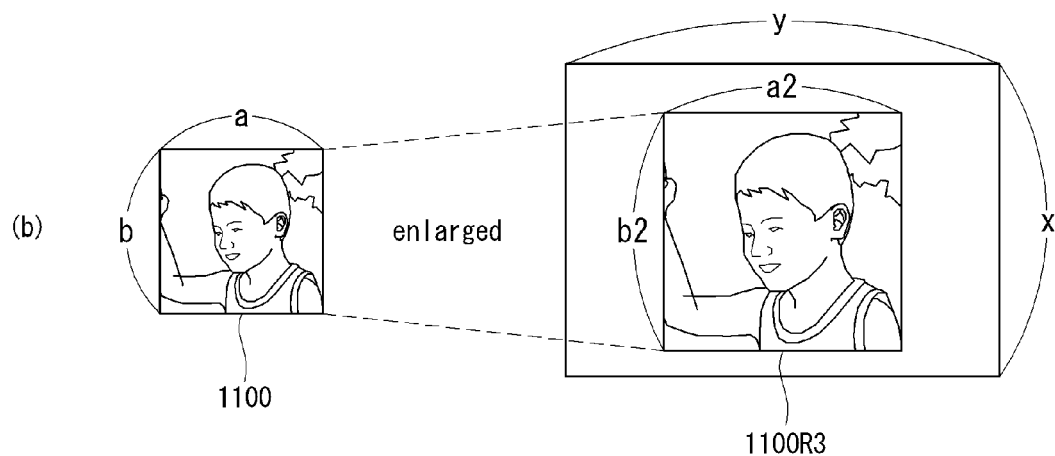
(b)

FIG. 9
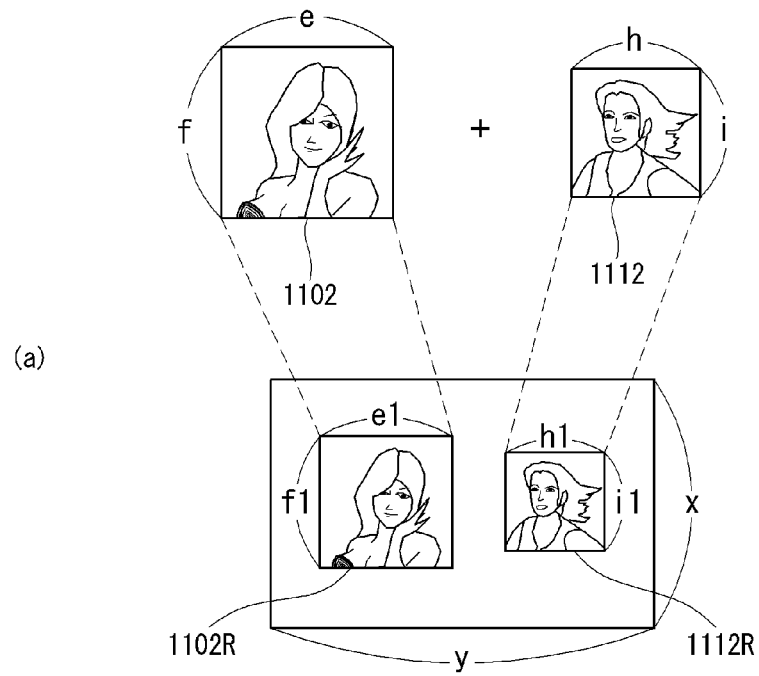
(a)
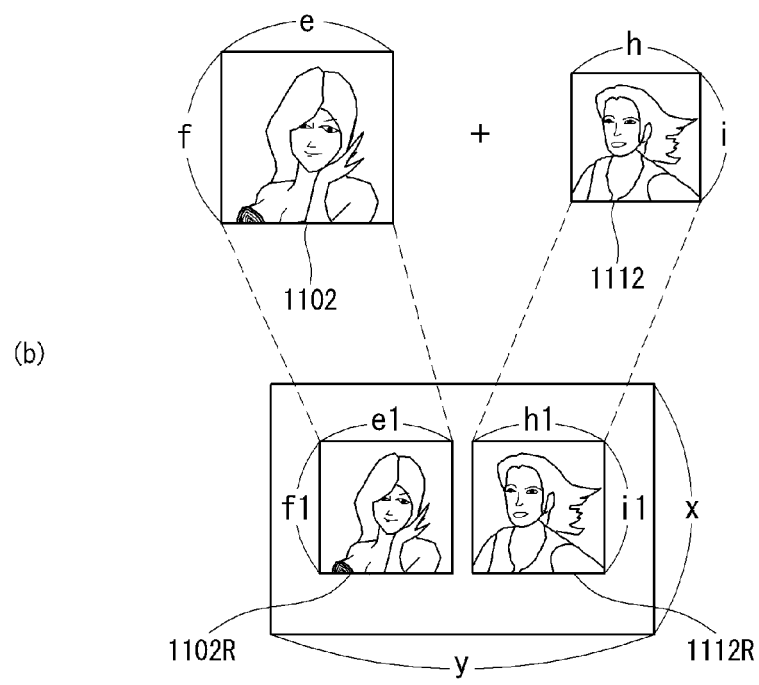
(b)

FIG. 11
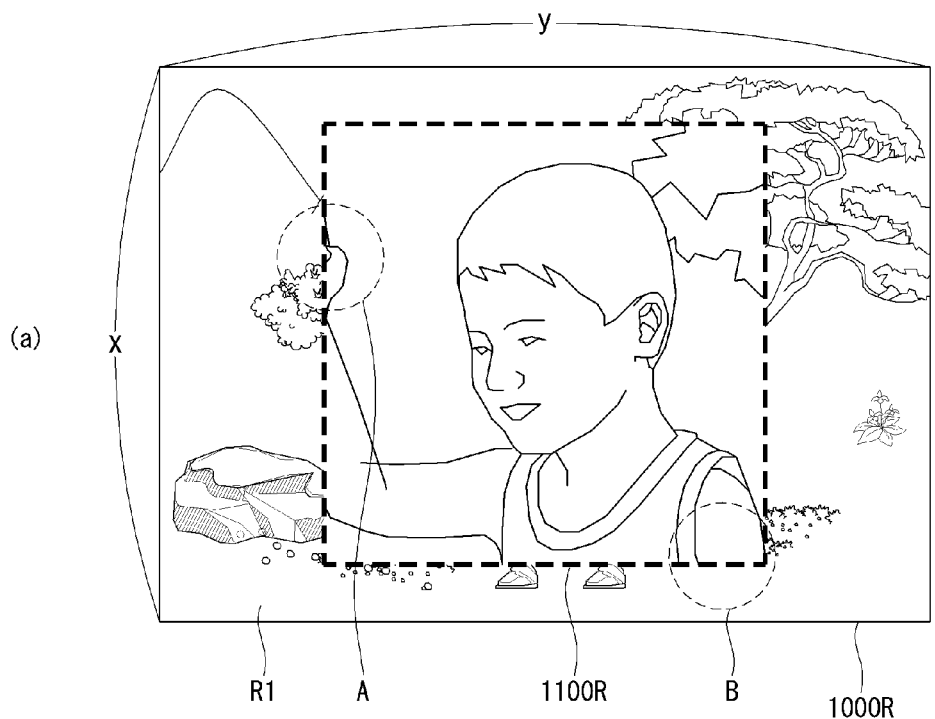
(a)
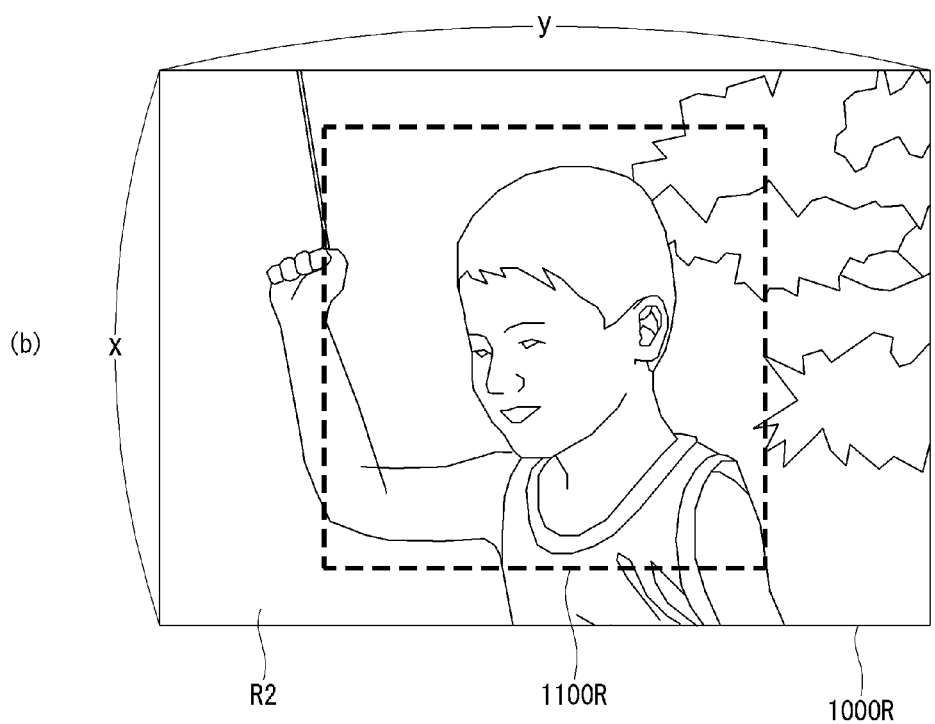
(b)

FIG. 12
(a)
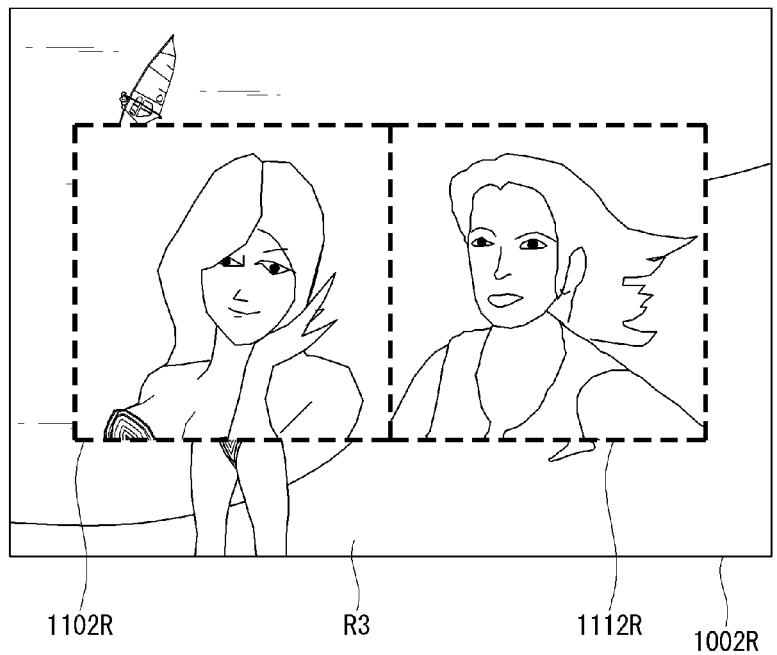
(b)
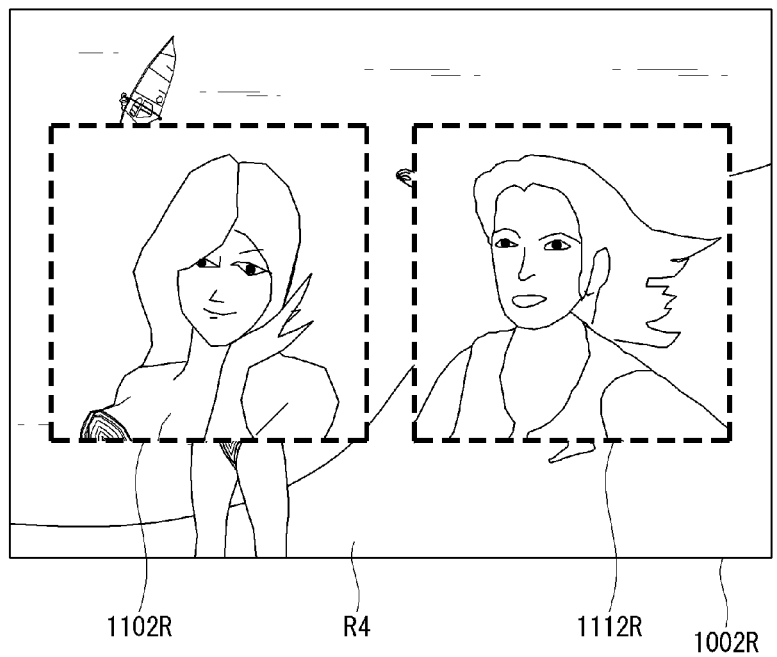

FIG. 13
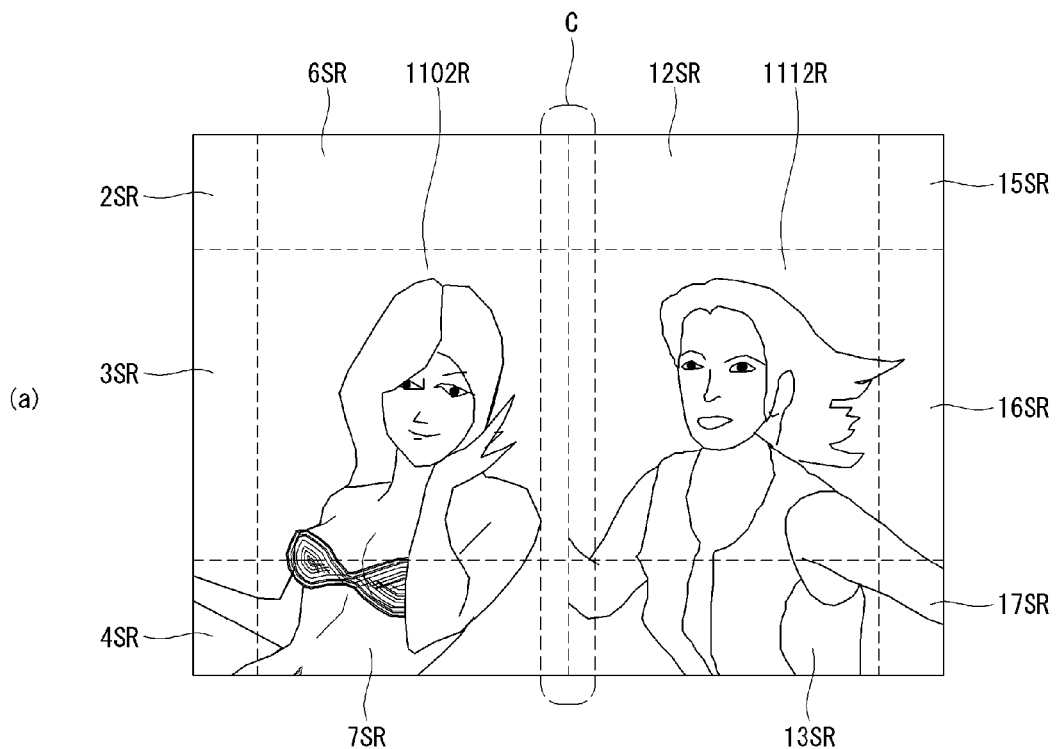
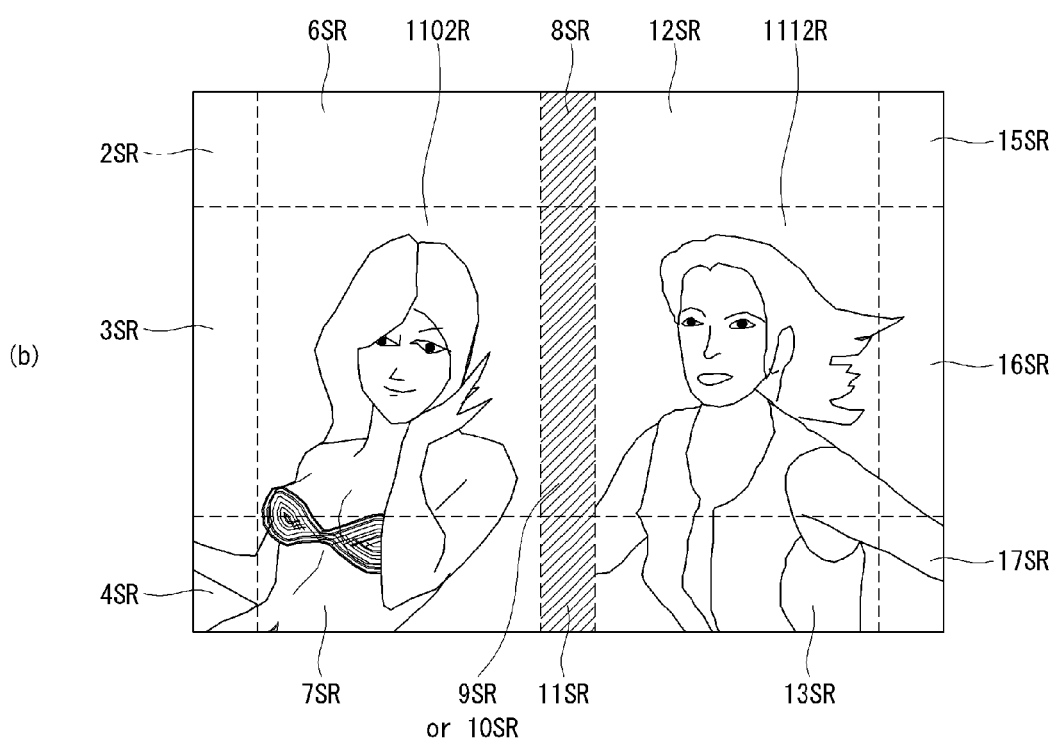

IMAGE RESIZING METHOD, IMAGE TRANSMISSION METHOD, AND ELECTRONIC DEVICE

CROSS-REFERENCE TO RELATED APPLICATION

This application claims priority to Korean Patent Application No. 10-2011-0043746 filed on May 11, 2011, the contents of which are herein incorporated by reference in its entirety.

BACKGROUND

1. Technical Field

The embodiments of this document are directed to a method of resizing an image to be appropriate for purposes.

2. Discussion of the Related Art

Recent development of technologies relating to image compression, digital cameras, or memory integration prompts production, distribution, and use of a number of types of digital image data. Various electronic devices provide functions of storing and displaying the digital image data correspondingly.

For users to more easily approach the digital image data, there is a need for providing resized digital image data to be suited for purposes to the users.

SUMMARY

Exemplary embodiments of this document provide an image resizing method and an electronic device that may provide a user with a final image resized from an original image so that the user may readily identify the original image through the resized image, and an image transmission method that may transmit the final image to another electronic device.

According to an embodiment, there is provided an image resizing method comprising obtaining an original image including a peripheral region and a core region including a target image, obtaining a resized image including the entire core region and part of the peripheral region, and displaying the resized image.

Obtaining the resized image includes identifying the core region from the obtained original image, and selecting part of the peripheral region according to a priority determined in consideration of the core region. The priority is determined based on a distance from the core region. The priority is determined based on whether there is an object associated with the core region.

The original image further comprises a second core area, wherein different resizing ratios are applied to the core area and the second core area, wherein each of the resizing ratios includes a reduction ratio and an expanding ratio.

Obtaining the resized image comprises resizing the core region, and resizing the peripheral region, wherein different resizing ratios are applied to the core area and the peripheral area, wherein each of the resizing ratios includes a reduction ratio and an expanding ratio.

According to an embodiment, there is provided an image transmission method comprising obtaining an original image including a peripheral region and a core region including a target image, obtaining a display size of a target electronic device to which the original image is to be transmitted, obtaining a target size to which the original image is resized based on the obtained display size, and transmitting a resized image including the entire core region and part of the peripheral region in consideration of the obtained target size to the target electronic device.

Transmitting the resized image comprises identifying the core region from the obtained original image, and selecting part of the peripheral region according to a priority determined in consideration of the core region. The priority is determined based on a distance from the core region. The priority is determined based on whether there is an object associated with the core region.

The original image further comprises a second core area, wherein different resizing ratios are applied to the core area and the second core area, wherein each of the resizing ratios includes a reduction ratio and an expanding ratio.

Transmitting the resized image comprises resizing the core region, and resizing the peripheral region, wherein different resizing ratios are applied to the core area and the peripheral area, wherein each of the resizing ratios includes a reduction ratio and an expanding ratio.

According to an embodiment, there is provided an electronic device comprising a display unit, a storage unit that stores an original image including a peripheral region and a core region including a target image, and a controller that obtains a resized image including the entire core region and part of the peripheral region and displays the resized image.

According to an embodiment, there is provided an electronic device comprising a communication unit that communicates with a first electronic device, a storage unit that that stores an original image including a peripheral region and a core region including a target image, and a controller that obtains a display size of a target electronic device to which the original image is to be transmitted, obtains a target size to which the original image is resized based on the obtained display size, and transmits a resized image including the entire core region and part of the peripheral region in consideration of the obtained target size to the target electronic device.

According to the embodiments, a user may further intuitively identify the original image through the resized thumbnail image with respect to the target image.

Further, since the resized image is transmitted to another electronic device, data traffic may be reduced.

BRIEF DESCRIPTION OF THE DRAWINGS

FIGS. 7 to 10 are views for describing a method of resizing a core region in consideration of a target size according to an embodiment of this document.

FIGS. 11 to 13 are views for describing a method of generating a resized final image according to an embodiment of this document.

DESCRIPTION OF THE EMBODIMENTS

As used herein, the terms are used for convenience of description of the embodiments of this document. It will be understood that the embodiments of this document are not limited to the terms.

When an element is referred to as being "connected to" or "coupled to" another element, it can be directly connected or coupled to the other element or intervening elements may be present. The terms "module", "portion", or "part" are used for convenience of description and should not be construed as providing different meanings or functions.

As described herein, the electronic device 100 may include a television, a DTV (Digital Television), an IPTV (Internet Protocol Television), a mobile phone, a smart phone, a PDA (Personal Digital Assistant), a laptop computer, a tablet computer, a digital broadcast terminal, a mobile terminal, a navigation terminal, or any other electronic device that is apparent by one of ordinary skill in the art.

Hereinafter, embodiments of this document will be described with reference to the accompanying drawings, wherein the same reference numbers may be used to denote the same or substantially the same elements.

The electronic device 100 according to an embodiment of this document may obtain information on an original image and a final image resized from the original image. For example, the electronic device 100 may obtain a final image that has been substantially enlarged or reduced in size from the original image. For example, the electronic device 100 may obtain a final image whose aspect ratio is different from an aspect ratio of the original image.

In obtaining the final image from the original image, in the case that the original image includes a target image predetermined by a user, the electronic device 100 may resize the original image with respect to the target image to obtain the final image. For example, in the case that a face is designated as the target image and the original image includes the face, the electronic device 100 may perform resizing on the original image with respect to the face.

Hereinafter, a construction of an electric device according to an embodiment of this document will be first described, and an operation of the electric device will be then described.

Figure 1:
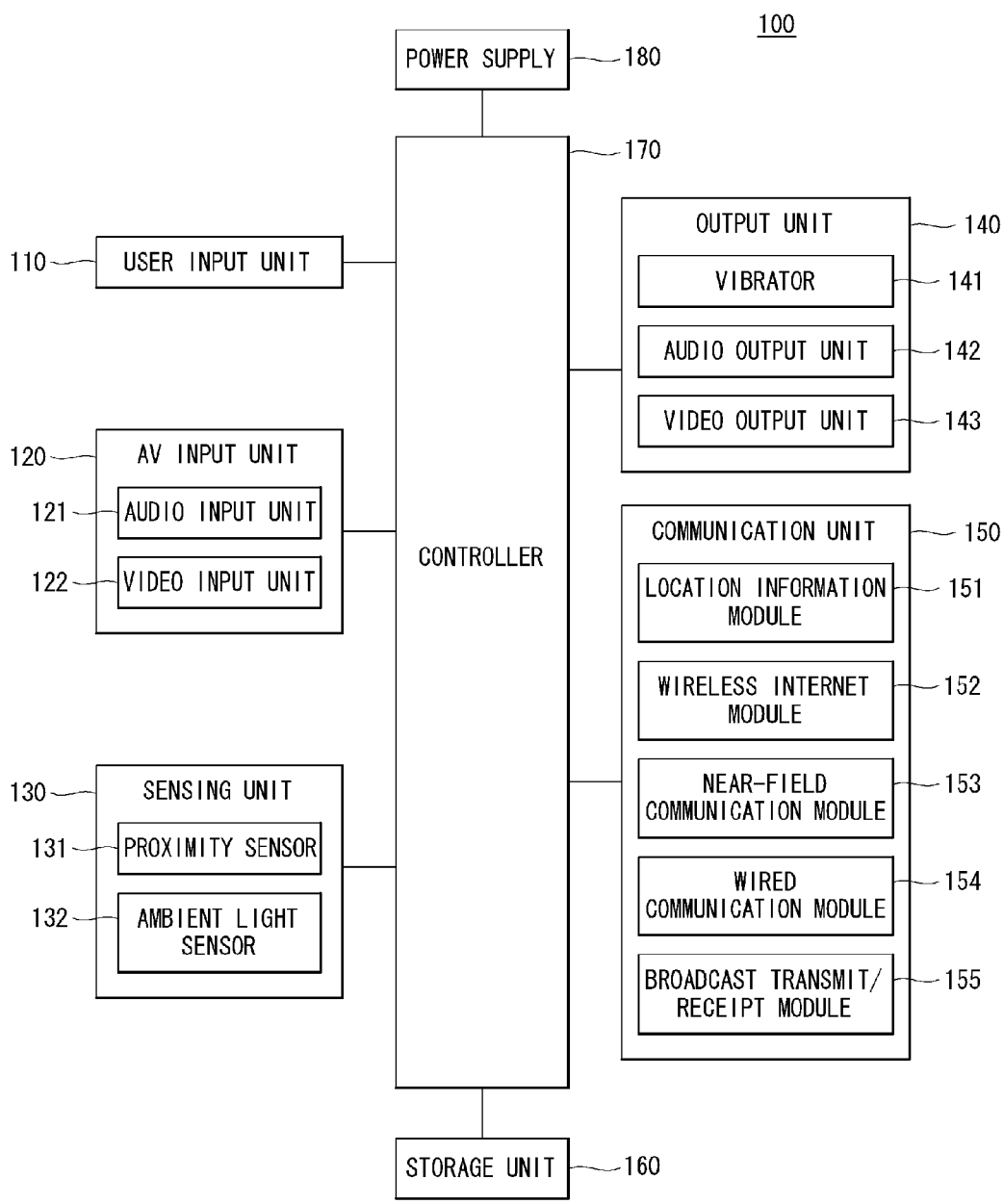
FIG. 1 is a block diagram illustrating an electronic device according to an embodiment of this document.

An electronic device 100 according to an embodiment of this document will be described with reference to FIG. 1. FIG. 1 is a block diagram illustrating an electronic device according to an embodiment of this document.

Referring to FIG. 1, the electronic device 100 includes a user input unit 110 for receiving a user's input, an AV (audio/video) input unit 120 for obtaining sound information and image information, a sensing unit 130 for sensing various states, an output unit 140 for outputting information, a communication unit 150 for performing communication, a storage unit 160 for storing information, a controller 170 for controlling the whole operation of the electronic device 100, and a power supply 180 for supplying power to the electronic device 100.

The above elements are not inevitable elements for the electronic device 100. Accordingly, the electronic device 100 need not include all of the elements. For example, the electronic device 100 may selectively include the elements.

Hereinafter, the elements of the electronic device 100 will be described with reference to FIG. 1 in the order of the user input unit 110, the AV input unit 120, the sensing unit 130, the output unit 140, the communication unit 150, the storage unit 160, the controller 170, and the power supply 180.

The user input unit 110 receives a user's input. The user may directly manipulate the operation of the electronic device 100 through the user input unit 110. For example, the electronic device 100 may receive from the user various inputs necessary for selecting an original image to be resized or selecting a target size to which the original image is resized through the user input unit 110 or for resizing the original image.

The user input unit 110 may include a key pad, a dome switch, a jog wheel, a jog switch, a touchpad, or any other input device that is apparent from one of ordinary skill in the art.

The AV input unit 120 obtains at least one of sound information and image information. The AV input unit 120 may include at least one of an audio input unit 121 for obtaining sound information and a video input unit 122 for obtaining image information.

The audio input unit 121 obtains sound information. According to an embodiment, the audio input unit 121 may be implemented as a microphone that receives an external sound signal and performs an electrical treatment on the received sound signal to obtain the sound information. According to an embodiment, the audio input unit 121 may be implemented as an interface to which a sound signal, such as a broadcast signal, is input from an external source to obtain the sound information.

According to an embodiment, the audio input unit 121 may perform a noise cancelling algorithm that gets rid of noises created while receiving the sound signal from the external source.

The sound information obtained by the audio input unit 121 is output through the output unit 140, such as a speaker, or transmitted through the communication unit 150 to an outside destination, or stored in the storage unit 160.

The video input unit 122 obtains image information. The image information obtained by the video input unit 122 is output by the output unit 140, such as a display, is transmitted to an external destination (not shown) through the communication unit 150, or is stored in the storage unit 160. The video input unit 122 may be implemented as a camera or an interface through which an image signal is received from an external source (not shown).

The camera obtains image information, such as a still image or moving picture, depending on an optical signal that may include visual light, or infrared or ultraviolet rays that are invisible.

The camera may include at least one of a 2D camera and a 3D camera. The 2D camera receives light from an external source to obtain information on contrast or color ton, thereby obtaining a 2D image. For example, the 2D camera may obtain image information based on light received through an image sensor implemented as a CCD (Charge Coupled Device) or CMOS (Complementary Metal Oxide Semiconductor).

The 3D camera receives light from an external source and obtains depth information based on the received light. By doing so, the 3D camera may obtain a 3D image, such as a depth image reflecting the depth information.

The sensing unit 130 senses various states. The sensing unit 130 includes a proximity sensor 131 and an ambient light sensor 132.

The proximity sensor 131 can sense whether there is an object approaching a predetermined sensing surface of the sensor 131 or whether there is an object around the sensor 131. The proximity sensor 131 can sense presence or absence of an object using an electrical, optical signal with respect to the sensing surface. The proximity sensor 131 does not require mechanical contact, thus providing a long life span and high usability compared to a contact sensor.

The proximity sensor 131 includes a transmissive photoelectric sensor, a direct reflection-type photoelectric sensor, a mirror reflection-type photoelectric sensor, a high frequency oscillation-type proximity sensor, an electrostatic capacitance-type proximity sensor, a magnetic proximity sensor, and an infrared proximity sensor.

The ambient light sensor 132 can measure ambient illuminance of the electronic device 100. The electronic device 100 can adjust the brightness of the display depending on the illuminance measured by the ambient light sensor 132.

The output unit 140 outputs information. A user receives various types of information through the output unit 140 from the electronic device 100.

The output unit 140 outputs information using at least one of a tactile signal, an auditory signal, and a visual signal. The output unit 140 may include at least one of a display, a speaker, a vibrator, and an output device apparent to one of ordinary skill in the art.

The output unit 140 may include at least one of a vibrator 141, an audio output unit 142, and a video output unit 143.

The vibrator 141 outputs a tactile signal. For example, the vibrator 141 generates a user perceptible vibration. The vibrator 141 controls the strength and pattern of vibration to generate various vibrations.

In addition to the vibration, the vibrator 141 may generate a tactile signal as a pin arrangement moves perpendicular to a contact skin surface, a tactile signal according to a blowing force or suction force of air through an injection hole or absorption hole, a tactile signal that skims a skin surface, a tactile signal according to a contact of an electrode, a tactile signal using an electrostatic force, or a tactile signal, such as coldness or warmth, by an element that absorbs or generate heat.

The vibrator 141 may generate a tactile signal transferred through a user's finger or arm as well as a tactile signal transferred through a direct contact.

The audio output unit 142 may output an auditory signal, for example, a sound signal. For example, the audio output unit 142 may output a sound signal based on sound information received from the communication unit 150 or stored in the storage unit 160. For example, the audio output unit 142 may output sound signals relating to various functions that are performed by the electronic device 100.

The audio output unit 142 may include a receiver, a speaker, or a buzzer. The audio output unit 142 may also output a sound through an earphone connected to an earphone jack.

The video output unit 143 may output a visual signal. For example, the video output unit 143 may display image information. For example, the electronic device 100 may output an original image and/or a final image resized from the original image through the video output unit 143. For example, the video output unit 143 may display a user interface, such as a graphic user interface (GUI). The graphic user interface allows a user to easily select the original image and/or final image or to easily edit the final image.

The video output unit 143 may include a liquid crystal display (LCD), a thin film transistor liquid crystal display, an organic light-emitting diode display, a flexible display, a 3-dimensional display, or any display apparent from one of ordinary skill in the art.

The video output unit 143 may be implemented as a plurality of displays or to have a plurality of display screens. According to an embodiment, the video output unit 143 may be implemented as a beam projector that may display 3D hologram images or may display images on a screen.

According to an embodiment, the output unit 140 and the user input unit 110 may be integrally formed with each other.

For example, the output unit 140 and the user input unit 110 may be implemented as a touch screen that may display information and may receive a touch input. The touch screen may include a display for displaying information and a touch panel for detecting a touch input, wherein the display and the touch panel are arranged one above the other. The touch panel may receive a touch and may detect at least one of the location, area, and strength of the touch.

Depending on a method of detecting a touch, various touch panels may be provided, which include a resistive touch panel, an ultrasound reflective touch panel, a capacitive touch panel, or an infrared ray touch panel.

The communication unit 150 may perform communication with an external device (not shown) to transmit/receive information to/from the external device.

The communication unit 150 may include at least one of a location information module 151, a wireless internet module 152, a near-field communication module 153, a wired communication module 154, and a broadcast transmit/receipt module 155.

The location information module 151 may obtain location information.

The location information module 151 may obtain location information using a global navigation satellite system (GNSS). The GNSS includes a navigation satellite moving around the earth and a navigation receiver that receives a radio wave from the navigation satellite and yields information on an earth surface or a location near the earth surface based on the received radio wave.

The location information module 151 may also communicate with a base station for mobile communications to receive communication signals and may obtain the location information using triangulation based on the received communication signals.

The location information module 151 may obtain the location information through communication with an access point over an LAN.

The wireless Internet module 152 may access the Internet in a wired or wireless manner to transmit/receive various types of information. The wireless internet module 152 may be included inside or outside the electronic device 100, or may be detachably mounted in the electronic device 100.

The Internet access of the wireless internet module 152 may be performed based on at least one of various communication schemes, including LAN (local area network), WLAN (wireless LAN), a Wibro™ or WiMax, or HSDPA (high speed downlink packet access).

The near-field communication module 153 may perform near-field wireless communication based on at least one of various near-field communication schemes, including Bluetooth, RFID (radio frequency identification), IrDA (infrared data association), UWB (ultra wideband), or ZigBee.

The near-field communication module 153 may communicate with various external devices that are located near the electronic device 100. For example, the electronic device 100 may perform through the near-field communication module 153 data communication with an electronic device, such as a TV, a PC, a laptop computer, a cellular phone, a smart phone, an NAS (Network Attached Storage), a home server, or a remote controller.

The wired communication module 154 may connect the electronic device 100 with an external device in a wired manner.

The wired communication module 154 may perform communication with the external device through various interfaces. Examples of such interfaces include a USB (universal serial bus) port, a RS-232 standard port, a headset port, an external electric recharger port, a data port, a memory card port, an audio input/output (I/O) port, a video I/O port, or an earphone jack.

The broadcast transmit/receipt module 155 may receive at least one of a broadcast signal and broadcast-related information from an external broadcast server through a broadcast channel. The broadcast channel may include at least one of a satellite channel and a terrestrial channel. The broadcast server may include a server that generates and broadcasts at least one of the broadcast signal and broadcast-related information or a server that receives a pre-generated broadcast signal and broadcast-related signal and broadcasts the signal and information to broadcast terminals. At least one of the broadcast signal and broadcast-related information received through the broadcast transmit/receipt module 155 may be stored in the storage unit 160.

The broadcast signal may include a TV broadcast signal, a radio broadcast signal, a data broadcast signal, or a combination thereof.

The broadcast-related information may include information relating to a broadcast channel, a broadcast program, or a broadcast service provider. The broadcast-related information may be provided through a separate communication network.

The broadcast-related information may include an EPG (electronic program guide) for DBM (digital multimedia broadcasting) or DVB-H (digital video broadcast-handheld).

The broadcast transmit/receipt module 155 may receive a broadcast signal through various broadcast systems that may include DMBT (digital multimedia broadcasting terrestrial), DMBS (digital multimedia broadcasting satellite), MediaFLO (media forward link only), DVBH (digital video broadcast handheld), and ISDBT (integrated services digital broadcast terrestrial).

The configuration of the communication unit 150 and the way the communication unit 150 performs communications are not limited to those described above. For example, according to embodiments, the communication unit 150 may conduct communications through various communication devices based on various communication schemes.

According to an embodiment, the communication unit 150 may communicate with an external device not only by a single communication module but also by plural communication modules as necessary.

The storage unit 160 may store information.

The storage unit 160 may store information necessary for operation of the electronic device 100 and information generated as the electronic device 100 operates. The information necessary for operation of the electronic device 100 may include, for example, an operating system. The information generated as the electronic device 100 operates may include a still image, a moving picture, and volume information.

The storage unit 160 may include various storage media, such as a flash memory, a RAM (random access memory), an SRAM (static random access memory), a ROM (read only memory), an EEPROM (electrically erasable programmable read only memory), a hard disk, a magnetic memory, a magnetic disk, an optical disc, such as a compact disc (CD) or Blu-ray disc, a card-type memory, such as an SD card, or the like.

The storage unit 160 may be provided inside or outside the electronic device 100 or may be detachably mounted in the electronic device 100. As a type provided outside the electronic device 100, the storage unit 160 may include an external hard disk or a web storage that may store data over the Internet.

The controller 170 may control the overall operation of the electronic device 100 and operations of the elements of the electronic device 100 other than the controller 170.

The controller 170 may be implemented as a computer or a similar device to the computer in software, hardware, or a combination thereof.

The controller 170 may be implemented in hardware as at least one of ASICs (application specific integrated circuits), DSPs (digital signal processors), DSPDs (digital signal processing devices), PLDs (programmable logic devices), FPGAs (field programmable gate arrays), processors, general controllers, micro-controllers, microprocessors, or an electric device that may perform control functions which are apparent from one of ordinary skill in the art.

The controller 170 may be implemented as a software code or application that is written by one or more program languages. The software may be stored in the storage unit 160 and may be executed by a hardware structure of the controller 170. The software may also be transmitted from an external device, such as a server, to the electronic device 100 and may be installed in the electronic device 100.

Further detailed description on the controller 170 will be given below upon describing a gesture-based key input method according to an embodiment of this document.

The power supply 180 may supply electric power to the electronic device 100. The power supply 180 may receive electricity from an external source or an internal source under control of the controller 170 to supply electric power necessary for operation of each element of the electronic device 100.

The electronic device 100 may be implemented as one of various electronic devices. For example, the electronic device 100 may be implemented as a TV, a DTV (digital television), an IPTV (internet protocol television), a mobile phone, a smart phone, a PDA (personal digital assistants), a PMP (portable multimedia player), a PC (personal computer), a laptop computer, a tablet computer, a digital broadcast terminal, a mobile terminal, a navigation terminal, or an electronic picture frame. However, the electronic device 100 is not limited to the above-listed exemplary devices, and may also be embodied as any electronic device that may store or receive data as apparent from one of ordinary skill in the art.

Hereinafter, an image resizing method according to an embodiment will be described. The image resizing method is described in association with the electronic device 100 according to an embodiment of this document. However, this is only for ease of description, and the image resizing method may be realized by any other electronic device.

The image resizing method will be described with reference to FIG. 2, which is a flowchart illustrating an image resizing method according to an embodiment of this document.

Figure 2:
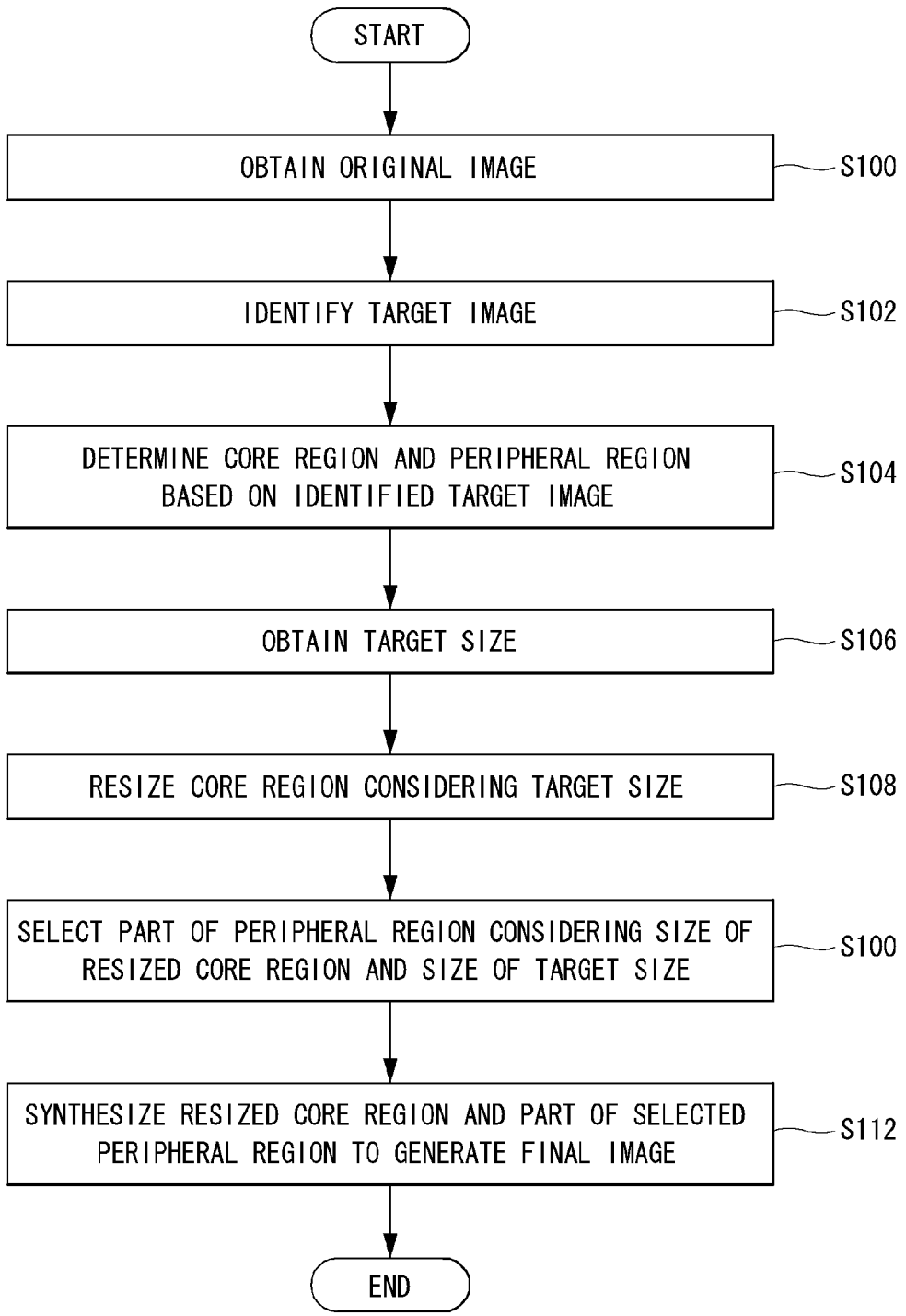
FIG. 2 is a flowchart illustrating an image resizing method according to an embodiment of this document.

The image resizing method, as shown in FIG. 2, may include at least one of obtaining an original image (S100), identifying a target image (S102), determining a core region and a peripheral region based on the identified target image (S104), obtaining a target size for resizing (S106), resizing the core region considering the target size (S108), selecting a portion of the peripheral region considering a size and aspect ratio of the resized core region and a size and/or aspect ratio of the target size (S110), and generating a final image by synthesizing the resized core region and the selected portion of the peripheral region (S112).

Hereinafter, each of the steps of the image resizing method will be described in further detail.

Figure 3:
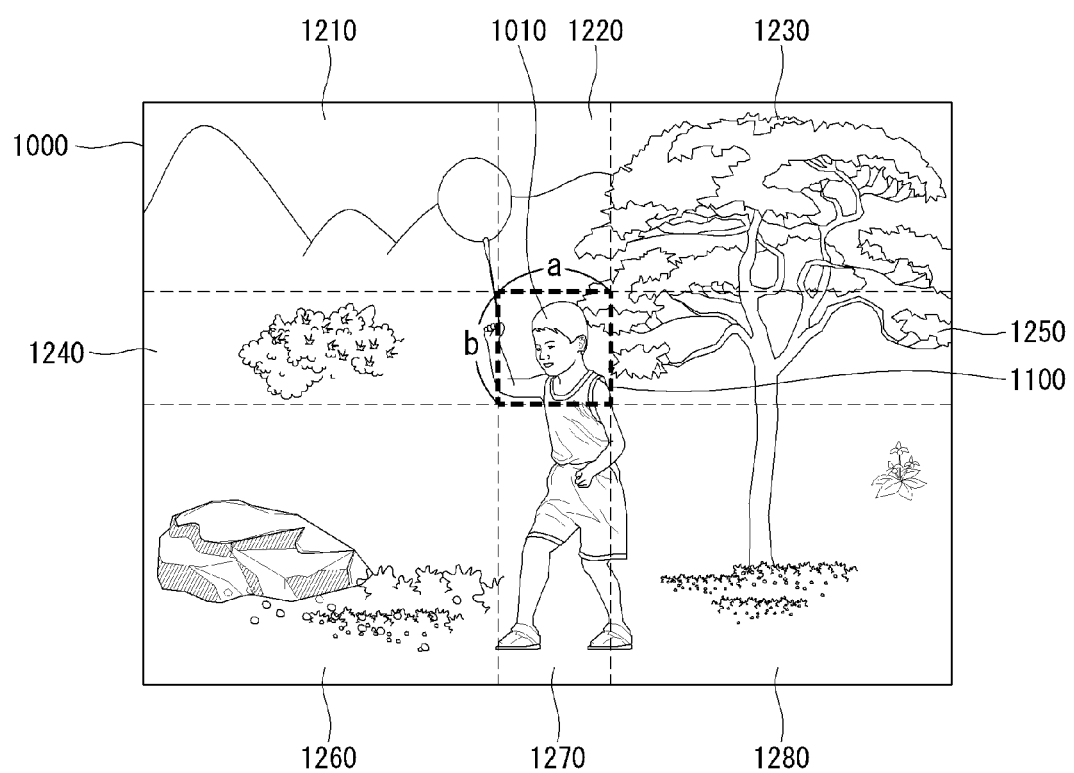
FIGS. 3 to 5 are views illustrating exemplary original images according to an embodiment of this document.
Figure 4:
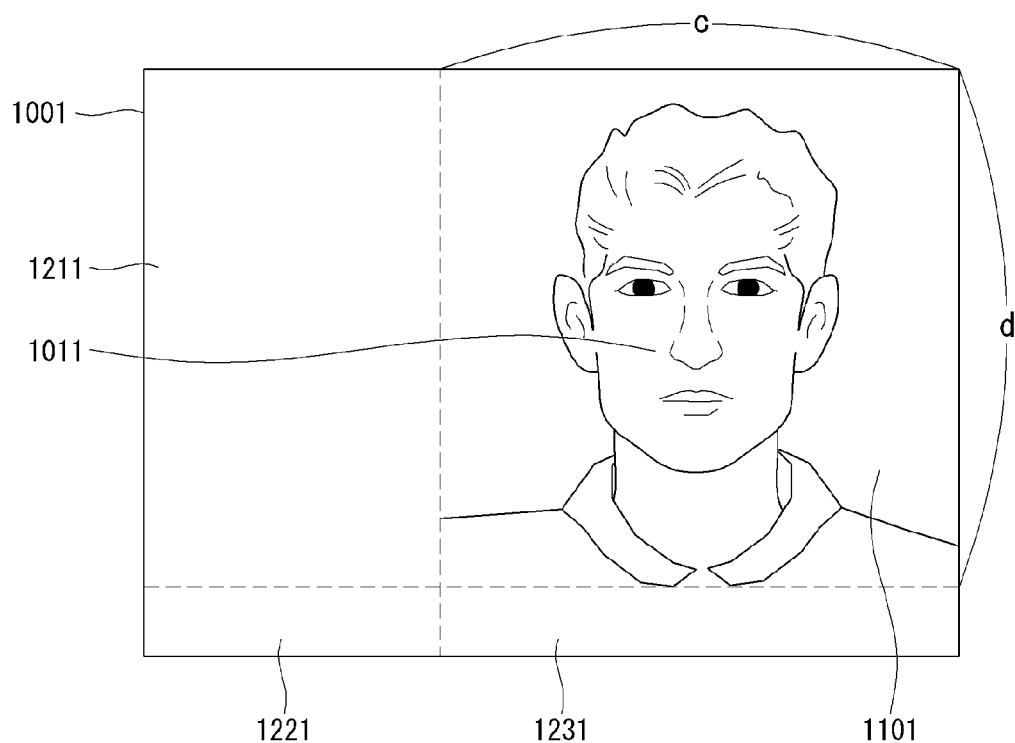
Figure 5:
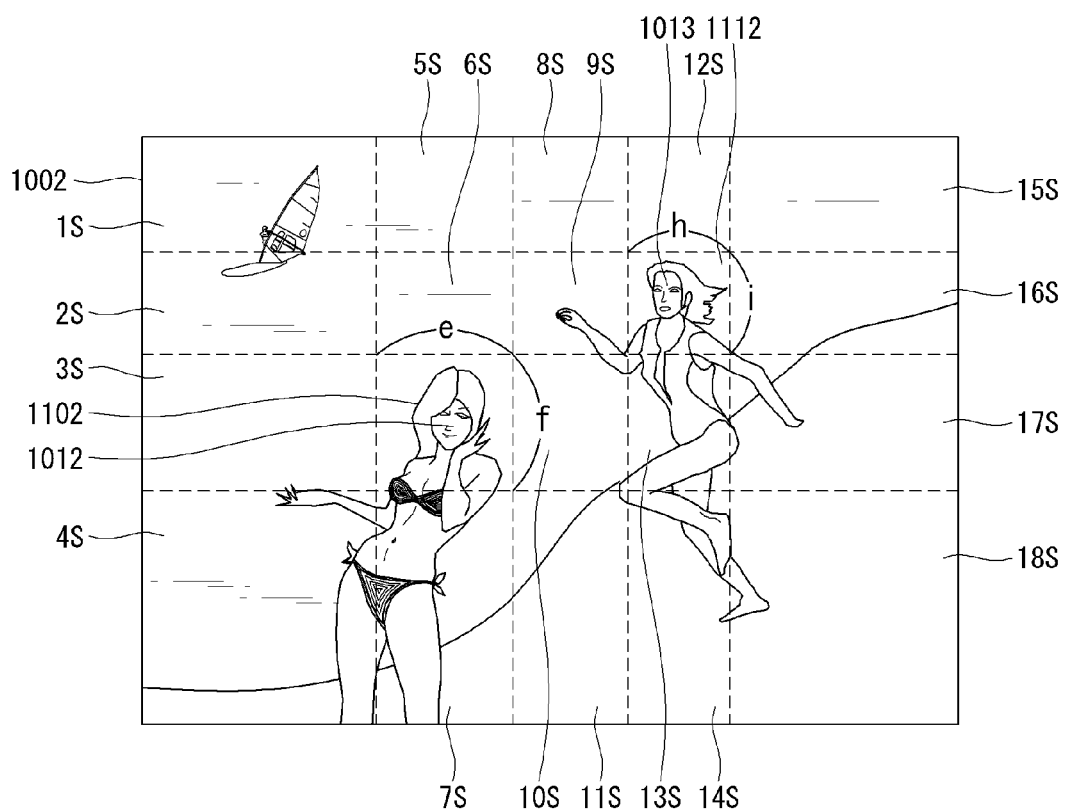

The electronic device 100 may obtain an original image (S100). FIGS. 3 to 5 illustrate exemplary original images 1000, 1001, and 1002. The original image may be previously stored in the storage unit 160 and may be received through the communication unit 150 from another electronic device.

The electronic device 100 may identify a target image (S102). The target image refers to an image serving as a center upon resizing of the original image. Among objects included in the original image while resizing the original, the target image may be an object of interest that has been set by a user. FIGS. 3 to 5 illustrate examples where human faces 1010, 1011, 1012, and 1013 are included in the original image. FIG. 5 illustrates an example where the original image includes faces of a plurality of humans 1012 and 1013.

The electronic device 100 may use an image analysis scheme to identify the target image from the original image.

The image analysis may be carried out by various ways. For example, recognizing a human face may be performed by the following method.

For the shape of a face and each bodily organ to be separated from image information and converted into data, a boundary line of an area is first detected. To detect the boundary line, methods of using an operator or separating a high-frequency portion using Fourier conversion may be employed. Despite simple algorithm and quick processing like Sobel operation, the method of using an operator has a disadvantage of not being able to eliminate noise. Fourier conversion suffers from the fact that it cannot effectively analyze most of image signals whose probabilistic characteristics vary over time since the analysis area is always constant with respect to time frequency.

As other methods, there are a method of detecting a human area, a method of utilizing a facial color tone, a method of using Huffmann conversion, and a method of using Back-_propagation based on the neural network theory.

The type of the target image may be selected by the user. For example, the user may select an image of a human face as the target image. Or, the user may select an animal's head as the target image. The user may select a flower as the target image as well. Besides, any type of object that may be recognized by the image analysis scheme may be selected as the target image.

The electronic device 100 may collectively apply the target image selected by the user to all original images that may be obtained by the electronic device 100. For example, in the case that the user previously sets a human face as the target image in the electronic device 100, the electronic device 100 may identify the human face as the target image whenever the electronic device 100 performs resizing of the original image.

Alternatively, the user may set a target image individually applied to an original image in the electronic device 100. For example, the user may designate a human face as the target image for some original images primarily relating to humans, and may designate an animal's head (for example, a dog's head) as the target image for other original images, for example, pictures of pets, such as puppies.

The electronic device 100 may provide various user interfaces to receive a target image depending on the user's selection.

For example, the electronic device 100 may provide the user with a list of a few target images designated as a default in the electronic device 100 so that the user may select a target image from the list. According to an embodiment, the electronic device 100 may store various analysis parameter values necessary for performing the image analysis scheme on the target images, wherein the analysis parameter values respectively correspond to the target images.

According to an embodiment, the electronic device 100 may provide a user interface that allows the user to arbitrarily select a specific object or area from an original image provided to the user. The user interface may provide objects for selection (for example, rectangular objects or circular objects) whose location, size, and/or shape may be changed depending on the user's input so that the user may easily select the specific area. The electronic device 100 may analyze the specific area or object selected as the target image by the user and may generate various analysis parameter values necessary for conducting the image analysis scheme by the user's selection. Further, the electronic device 100 may store the generated analysis parameter values in association with the respective corresponding target images selected by the user.

The electronic device 100 may determine a core region and a peripheral region based on the identified target image (S104). As used herein, the "core region" refers to an area containing the target image identified in step S102 in the original image. The core region may include at least the entirety of the identified target image. As used herein, the "peripheral image" refers to a region other than the core region in the original image.

Step S104 will be described in further detail with reference to FIGS. 3 to 5. Hereinafter, it is assumed that a human's face is selected and set as a target image.

Referring to FIG. 3, the original image 1000 shows that a human stands by a tree. If the electronic device 100 obtains the original image 1000 in step 100, then the electronic device 100 may identify the human's face 1010 in the original image as a target image in step S102. Subsequently, the electronic device 100 may determine a core region 1100 including the identified human's face 1010. The size of the core region 1100 may be determined depending on a predetermined criterion. For example, the size of the core region 1100 may be determined to have a minimum size including the identified target image. Or, the size of the core region 1100 may be determined to be greater than the minimum size including the target image. According to an embodiment, the size of the core region 1100 may be smaller than the size of the original image 1000. The electronic device 100 may determine the other portions than the core region 1100 as peripheral regions 1210, 1220, 1230, 1240, 1250, 1260, 1270, and 1280.

Referring to FIG. 4, a ratio of a human's face 1011 to an original image 1001 is larger than a ratio of the human's face 1010 to the original image 1000 shown in FIG. 3. As described in connection with FIG. 3, the electronic device 100 may identify the human's face 1011 set as the target image (S102) and may determine a core region 1101 including the human face 1011 while determining the remaining portions as peripheral regions 1211, 1221, and 1231.

Referring to FIG. 5, an original image 1002 includes two humans. As shown in FIG. 5, in the case that two or more target images 1012 and 1013 are present in the original image 1002, the electronic device 100 may identify all of the target images 1012 and 1013 and may determine two or more core regions 1102 and 1112 including the identified target images 1012 and 1013 based on the target images 1012 and 1013. Further, the electronic device 100 may determine the remainder of the determined core regions 1102 and 1112 as peripheral regions.

It is illustrated in FIG. 5 that the target images 1012 and 1013 are spaced apart from each other by a predetermined distance. According to an embodiment, in the case that the two identified target images included in the original image are located very close to each other or overlap each other, the electronic device 100 may determine a single core region that includes both the two target images. For example, in the event that an original image contains N target images at least two of which abut or overlap each other, the electronic device 100 may determine (N−1) core regions.

Figure 6:
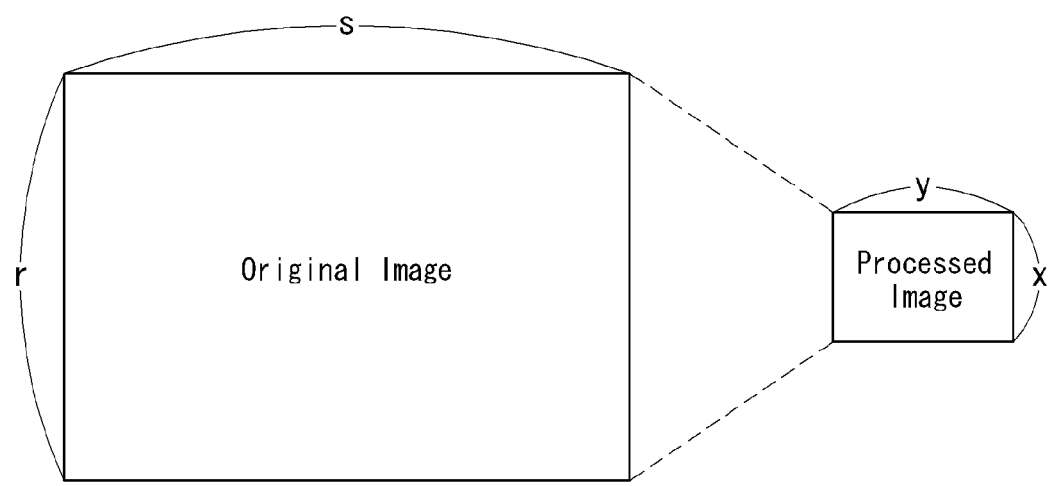
FIG. 6 is a view for describing a method of obtaining a target size according to an embodiment of this document.

The electronic device 100 may obtain a target size for resizing (S106). The "target size" refers to a size of a final image resized from the original image. For example, assuming that an original image shown in FIG. 6, which has a width (horizontal length) of s and a height (vertical length) of r, is resized to have a width of y and a height of x, the target size is x (width)×y (height).

The final image resized by the image resizing method according to the embodiment of this document may be utilized for various purposes.

For example, the image resizing method may be used to generate a thumbnail image that provides a preview for an original image.

As another example, when an original image whose size is suited for display by a first electronic device (for example, a TV) having a relatively large screen is transferred to a second electronic device (for example, a smart phone) having a relatively small screen or intended to be displayed by the second electronic device, the first electronic device resizes the original image to a size fitful for display on the first electronic device to generate a final image and transfers the resized final image to the second electronic device or allows the final image to be displayed by the second electronic device.

As described above, the resized final image may be used for various purposes, and thus, the electronic device 100 may obtain the target size in consideration of a purpose of the resized final image in step S106.

For example, if the resized image is used for a thumbnail image, the electronic device 100 may determine as the target size a size of a thumbnail image set in the electronic device 100.

Also, if an original image stored in the first electronic device is intended to be transferred to the second electronic device or to be displayed by the second electronic device, the first electronic device may obtain information on display size of the second electronic device and may determine a size appropriate for display in the second electronic device as the target size.

While obtaining the target size for resizing in step S106, the electronic device 100 may receive a target size value from the user.

The electronic device 100 may resize the size of the core region in consideration of the target size (S108). The step (S108) will be described in further detail with reference to FIGS. 7 to 10.

Figure 7:
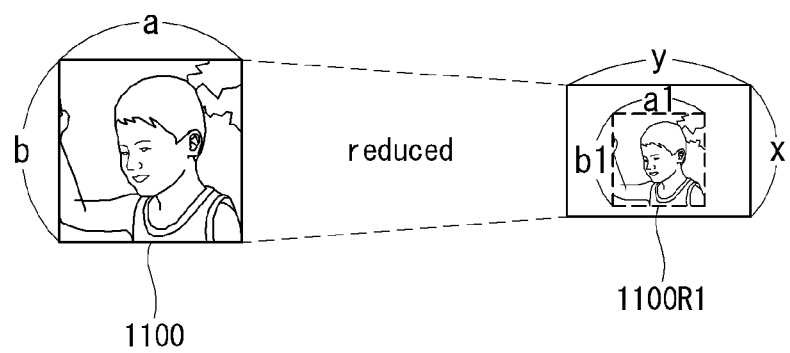

FIGS. 7 and 8 illustrate that the core region 1100 shown in FIG. 3 is resized based on the target size (height: x, width: y) obtained in step S106. Especially, FIG. 7 illustrates an example where the core region 1100 does not belong to the obtained target size, and FIG. 8 illustrates an example where the core region 1100 belongs to the obtained target size. The electronic device 100 may determine that the core region 1100 belongs to the target size in the case of satisfying a first condition, where a width a of the core region 1100 is smaller than a width y of the target size, and a second condition, where a height b of the core region 1100 is smaller than a height s of the target size.

If the core region 1100 is not included in the target size as shown in FIG. 7, the electronic device 100 may reduce the size of the core region 1100 according to a predetermined criterion. Accordingly, the core region 1100 of the original image may be curtailed to a predetermined size (1100R1).

The electronic device 100 may determine how much to reduce the core region 1100 based on various criteria. For example, in the case that height b of the core region 1100 of the original image is larger than height x of the target size, the electronic device 100 may reduce the height of the core region 1100 to b1 that is equal to or less than x. As shown in FIG. 7, in the case that width a of the core region 1100 of the original image is smaller than width y of the target size, width a of the core region 1100 of the original image may not be reduced.

However, under this situation, the aspect ratio of the core region 1100 is changed so that the reduced core region may be distorted. Accordingly, upon reducing at least one of the width and height of the core region 1100, the electronic device 100 may also diminish the other one to maintain the aspect ratio of the core region 1100 of the original image. For example, as shown in FIG. 7, height b of the core region 110 may be curtailed to b1.

In the case that the core region 1100 is included in the target size as shown in FIG. 8, the electronic device 100 may maintain or enlarge the size of the core region 1100 based on a predetermined criterion. For example, the size of the core region 1100 may be maintained without change as shown in FIG. 8A (1100R2), or may be expanded to a predetermined size (1100R3) as shown in FIG. 8B.

As shown in FIG. 8, when the core region 1100 is within the target size, various criteria may be available for determining whether to maintain or enlarge the size of the core region 1100.

For example, the electronic device 100 may calculate a difference between height b (or width a) of the core region 1100 and height x (or width y) of the target size, and may maintain the size of the core region 1100 when the difference is less than a predetermined reference value, and may enlarge the size of the core region 1100 when the difference is larger than the predetermined reference value.

While performing step S108, the electronic device 100 may resize the core region 1100 or may determine the location of the resized core region 1100R1, 1100R2, or 110083 in the target size. For example, the location of the resized core region 1100R1, 1100R2, or 1100R3 may be determined so that the center of the resized core region 1100R1, 1100R2, or 1100R3 conforms to the center of the target size.

Figure 10:
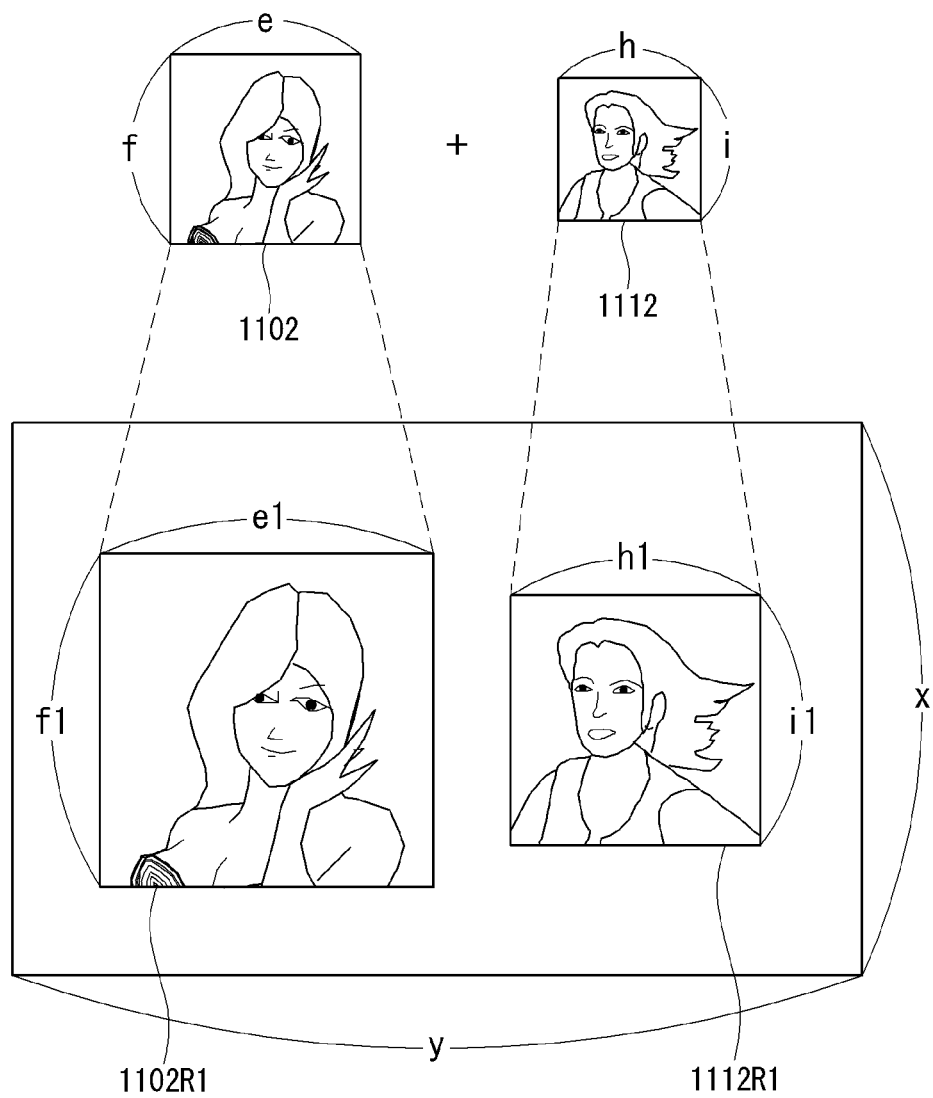

FIGS. 9 and 10 illustrate examples of resizing the core regions 1102 and 1112 shown in FIG. 5 based on the target size (height: x, width: y) obtained in step S106. In particular, FIG. 9 illustrates reducing at least one core region 1102 or 1112 considering the target size, and FIG. 10 illustrates enlarging at least one core region 1102 or 1112 considering the target size. The electronic device 100 may determine whether to reduce or enlarge at least one core region 1102 or 1112 based on a predetermined criterion. Various criteria may be available for expanding and/or reducing the core region 1102 or 1112.

The electronic device 100 may curtain both the core regions 1102 and 1112. If it is determined that each of the core regions 1102 and 1112 is not included in the target size, the electronic device 100 may decrease the size of both the core regions 1102 and 1112 an example of which is illustrated in FIG. 9A.

The electronic device 100 may reduce the core regions 1102 and 1112 so that a reduction ratio of the first core region 1102 is equal to a reduction ratio of the second core region 1112. Alternatively, the electronic device 100 may reduce the sizes of the core regions 1102 and 1112 with different reduction ratios. For example, as shown in FIG. 9B, the reduction ratio for the first core region 1102 is larger than the reduction ratio for the second core region 1112.

In the case that a plurality of core regions are included in the original image, the electronic device 100 may determine a reduction ratio (or expansion ratio) for each core region in consideration of a relative relationship in size between the core regions. For example, if all of the core regions have the same size, the electronic device 100 may apply the same reduction ratio (or expansion ratio) for the whole core regions in resizing. As another example, if the core regions have different sizes, the electronic device 100 may apply in resizing a reduction ratio (or expansion ratio) that allows the resized core regions to have substantially the same size (for example, so that the resized core regions have the same height or the same width).

According to an embodiment, the electronic device 100 may reduce only one of the core regions 1102 and 1112. For example, the electronic device 100 may reduce one of the core regions 1102 and 1112 while maintaining or rather enlarging the other. FIG. 9B shows an example where among the core regions 1102 and 1112, the first core region 1102 is reduced and the second core region 1112 is maintained in size.

In performing step S108, the electronic device 100 may position the resized core regions 1102R and 1112R in the target size while resizing the core regions 1102 and 1112. For example, a relationship in relative location between the resized core regions 1102R and 1112R may be changed. For example, whereas the first core region 1102 is located relatively lower than the second core region 1112 as shown in FIG. 5, the resized core regions 1102R and 1112R are positioned at substantially the same height as shown in FIGS. 9A and 9B.

Even when enlarging the size of the core regions 1102 and 1112 as shown in FIG. 10, the core regions 1102 and 1112 may be both expanded as described in relation to reduction of the core regions 1102 and 1112. However, the core regions 1102 and 1112 may be alternatively resized so that only one of the core regions 1102 and 1112 is expanded while the other is maintained or reduced in size. For example, the core regions 1102 and 1112 may be subject to different resizing ratios (expansion ratios or reduction ratios).

Turning back to FIG. 2, the steps subsequent to step S108 of the image resizing method according to the embodiment of this document will be described in further detail.

The electronic device 100 may select some of the peripheral regions in consideration of the size of the resized core region and the size of the target size (S110). Subsequently, the electronic device 100 synthesizes the resized core regions and the selected peripheral region to generate a final image (S112). Steps S110 and S112 will now be described in further detail with reference to FIGS. 11 to 13.

The electronic device 100 may select the core region and a peripheral region to be synthesized with the core region to obtain the resized final image. The electronic device 100 grants priority to the peripheral region depending on the difference between the core region and the peripheral region and determines the peripheral to be synthesized with the core region based on the priority.

For example, the electronic device 100 may place a higher priority to a peripheral region that is located further from the core region.

To select a peripheral region for synthesis that is positioned further away from the core region, the electronic device 100 may obtain a target size and may resize the overall original image to be suited for the target size as shown in FIG. 11.

In the event that the aspect ratio of the original image does not conform to the aspect ratio of the target size, the electronic device 100 may cut away part of the resized image not to experience image distortion while resizing the entire original image so that the resized image fits for the obtained target size. For example, in the case that the width (horizontal length) of the original image is smaller than the height (vertical length) of the original image while the target size has a smaller height than the width, the electronic device 100 first resizes the image so that the width of the resized image fits for the width of the target size, and cuts at least one of an upper portion and lower portion of the image for the height of the resized image to be suited for the height of the target size.

When placing the resized core region 1100R at a location determined in step S108 over the entire resized original image, a portion R1 of the peripheral region, which is not covered by the resized core region 1100R, may be selected in step S110. Subsequently, the electronic device 100 synthesizes the resized core region 1100R with the portion of the peripheral region resized and selected in step S110, thus generating a final image 1000R. The reduction ratio (or expansion ratio) for the selected peripheral region may be different from the reduction ratio (or expansion ratio) for the core region 1100.

As described above, in the case that a higher priority is granted to a peripheral region located further from the core region, discontinuity may occur at areas A and B between the resized core region 1100R and the resized peripheral region R1 in the resized final image 1000R as shown in FIG. 11A.

According to an embodiment, the electronic device 100 may place a higher priority to a peripheral region arranged closer to the core region. The electronic device 100, as shown in FIG. 11, may obtain a target size and may perform resizing on the entire original image depending on the same ratio as the reduction ratio (or expansion ratio) for the core region 1100. The electronic device 100 may select part of the resized original image, which corresponds to the obtained target size, thus generating a resized final image 1000R. Since the reduction ratio (or expansion ratio) for the selected peripheral region is equal to the reduction ratio (or expansion ratio) for the core region 1100, image continuity may be maintained between the resized core region 1100R and the resized peripheral region R1 in the resized final image 1000R as shown in FIG. 11B.

As another example, the electronic device 100 may identify a specific object included in the peripheral region, may determine relevance with the target image included in the peripheral region, and may then provide a higher priority as the relevance with the target image increases. For example, in the case that the target image is a human's face, a higher priority may be granted to a peripheral region including an object, such as a hat or vehicle, which is highly associated with the target image, for example, as if the human corresponding to the target image is determined to wear a hat or determined to ride a vehicle.

According to an embodiment, as shown in FIG. 5, the electronic device 100 may resize the original image including the plurality of core regions 1102R and 1112R. The electronic device 100 may obtain the target size and may resize the overall original image to be suited for the target size as shown in FIGS. 12A and 12E.

Even when the original image includes the plurality of core regions, the electronic device 100 may grant the priority to the peripheral region considering the core regions and may select the core region to be included in the final image subjected to resizing by synthesizing the core region with the peripheral region considering the granted priority.

In the case that a higher priority is assigned to a peripheral region located further from the core region, some peripheral regions R3 and R4 may be selected in step S110 that are not covered by the resized core regions 1102R and 1112R when the resized core regions 1102R and 1112R are arranged to overlap locations determined in step S108 over the resized original image. Subsequently, the electronic device 100 may synthesize the resized core regions 1102R and 1112R with some peripheral regions R3 and R4 resized and selected in step S110, thus producing the final image 1000R. The reduction ratio (or expansion ratio) for the selected peripheral region may be different from the reduction ratio (or expanding ratio) for the core region 1100. Accordingly, discontinuity may occur between the resized core region 1100R and resized peripheral regions R3 and R4 in the resized final image 1000R.

In the case that the original image includes a plurality of core regions, the electronic device 100 may arrange the identified core regions to abut each other or to be spaced apart from each other based on various criteria while generating a resized final image.

For example, in the case that an object highly associated with at least one core region of the plurality of core regions included in the original image is included in the plurality of core regions, the electronic device 100 may arrange the plurality of objects to be spaced apart from each other to select the core region including the highly associated object in step S110. As another example, in the case of provision of a plurality of core regions, the electronic device 100 may store whether to arrange the core regions to abut or be spaced apart from each other as a basic value. According to an embodiment, the electronic device 100 may obtain a criterion by which the electronic device 100 determines whether to arrange the plurality of core regions to abut or spaced apart from each other.

FIG. 13A illustrates an example where a plurality of core regions are arranged to abut each other. The electronic device 100, as shown in FIG. 13A, may arrange the resized core regions 1102R and 1112R without a space therebetween. The electronic device 100 may select some of peripheral regions (2S, 3S, 4S, 6S, and 7S of FIG. 5) adjacent to the first core region 1102 and may resize the selected peripheral regions 2S, 3S, 4S, 6S, and 7S depending on the reduction ratio (or expanding ratio) applied to the first core region 1102, thereby generating resized peripheral regions 2SR, 3SR, 4SR, 6SR, and 7SR adjacent to the first core region 1102R.

Further, the electronic device 100 may select some of peripheral regions (12S, 13S, 15S, 16S, and 17S of FIG. 5) adjacent to the second core region 1112 and may resize the selected peripheral regions 12S, 13S, 15S, 16S, and 17S depending on the reduction ratio (or expansion ratio) applied to the second core region 1112, thus generating resized peripheral regions 12SR, 13SR, 15SR, 16SR, and 17SR adjacent to the second core region 1112R.

As described above, the electronic device 100 may synthesize resized, selected core regions 1102R and 1112R with the peripheral regions 2SR, 3SR, 4SR, 6SR, 7SR, 12SR, 13SR, 15SR, 16SR, and 17SR to generate the resized final image 1002R. No image discontinuity may occur between the resized first core region 1102R and its adjacent peripheral regions 2SR, 3SR, 4SR, 6SR, and 7SR. However, image discontinuity may occur between the first core region 1102R and the second core region 1112R, between the areas 6SR and 12SR, and between the areas 7SR and 13SR.

FIG. 13B illustrates an example where the plurality of core regions are arranged to be spaced apart from each other. As shown in FIG. 13B, the electronic device 100 may arrange the resized core regions 1102R and 1112R with a predetermined distance between the areas 1102R and 1112R. The electronic device 100 may perform selection and resizing of the peripheral regions (2S, 3S, 4S, 6S, and 7S of FIG. 5) adjacent to the first core region 1102 and the peripheral regions (12S, 13S, 15S, 16S, and 17S of FIG. 5) adjacent to the second core region 1112 by the same method as described in connection with FIG. 13A.

In selecting and resizing the peripheral regions to be arranged between the core regions 1102R and 1112R, the electronic device 100 may perform resizing based on one of the reduction ratio (or expansion ratio) applied to the first core region 1102R and the reduction ratio (or expansion ratio) applied to the second core region 1112R. The electronic device 100 may generate the resized final image 1002R by synthesizing the resized, selected core regions 1102R and 1112R with the peripheral regions 2SR, 3SR, 4SR, 6SR, 7SR, 8SR, 9SR (or 10SR), 11SR, 12SR, 13SR, 15SR, 16SR, 17SR. The peripheral region 9SR or 10SR arranged between the first and second core regions 1102R and 1112R may be the resized one of either or both of the peripheral regions 9S or/and 10S corresponding to the original image.

The method of resizing an original image has been specifically described. As mentioned earlier, the resized image according to the embodiments of this document may be used for various purposes.

For example, the resized image may be used for a thumbnail image for preview of an original image. The electronic device 100 may provide as the thumbnail image a resized image pre-stored according to the image resizing method. The user may intuitively identify the original image through the thumbnail image resized with respect to a target image.

According to an embodiment, when providing an original image to another electronic device, the electronic device 100 may first resize the original image based on the image resizing method according to the embodiment and may then transfer the resized image to the other electronic device. The electronic device 100 may obtain information on the display size of the other electronic device and may generate an image resized to a size appropriate for the display size. This allows a user of the other electronic device to further intuitively identify the original image through the image resized with respect to the target image. Further, the embodiments of this document may reduce data traffic since resized images are transferred to other electronic devices.

It should be noted that all of the steps constituting the image resizing method are not inevitable and some of the steps may be omitted. Further, the steps of the image resizing method may be performed in other orders than that described above. For example, a posterior step may also be conducted earlier than its prior step.

The embodiments of the image resizing method may be performed alone or in combination. Also, the steps constituting an embodiment may be performed separately or in combination of the steps constituting another embodiment.

The image resizing method according to the embodiments of this document may be stored in a computer-readable recording medium in the form of codes or program that may execute the method.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:
1. An image resizing method comprising:
 displaying, by a processor, an original image;
 receiving, by the processor, a target image;
 identifying, by the processor, a peripheral region and first and second core regions in the original image based on the target image;

determining, by the processor, a target size based on a predetermined criterion to which the original image is resized;

determining, by the processor, whether to reduce or enlarge the peripheral region and the first and second core regions and whether to change a position of the peripheral region and the first and second core regions based on the determined target size, a priority determined based on whether the peripheral region includes an object associated with the first core region or the second core region, and relevance with the target image; and displaying, by the processor, a resized image including the entire first and second core regions and part of the peripheral region on the display, the resized image being resized according to the priority determined based on whether the peripheral region includes an object associated with the first core region or the second core, wherein at least one of the first and second core regions is reduced or enlarged based on the determined target size, wherein the resized image includes at least one of the first and second core regions located at a changed position relative to the original image, wherein the part of the peripheral region displayed in the resized image is selected based on determining that the part of the peripheral region includes the object that is associated with at least one of the first and second core regions according to the priority and the relevance, and wherein the part of the peripheral region displayed in the resized image is not selected based on determining that the part of the peripheral region does not include the object that is associated with at least one of the first and second core regions according to the priority and the relevance.

2. The image resizing method of claim 1, wherein obtaining, by the processor, the resized image includes identifying the first and second core regions from the obtained original image, and selecting the part of the peripheral region according to the priority determined in consideration of the core region.

3. The image resizing method of claim 2, wherein the priority is determined based on a distance from the first core region or the second core region.

4. The image resizing method of claim 1, wherein image discontinuity occurs at a border between a resized core region and a resized peripheral region included in the resized image.

5. The image resizing method of claim 1, wherein different resizing ratios are applied to the first core region and the second core region, and wherein each of the resizing ratios includes a reduction ratio and an expanding ratio.

6. The image resizing method of claim 1, wherein obtaining, by the processor, the resized image comprises resizing the first core region or the second core region, and resizing the peripheral region, wherein different resizing ratios are applied to the first core region or the second core region and the peripheral region, and wherein each of the resizing ratios includes a reduction ratio and an expanding ratio.

7. The image resizing method of claim 1, further comprising:
receiving, by the processor, a selection input for a type of the target image.

8. The image resizing method of claim 1, further comprising:
displaying, by the processor, the original image when receiving a selection input for the displayed, resized image.

9. An image transmission method comprising:
displaying, by a processor, an original image;
receiving, by the processor, a target image;
identifying, by the processor, a peripheral region and first and second core regions in the original image based on the target image;
determining, by the processor, a display size of a target electronic device to which the original image is to be transmitted and a target size to which the original image is resized based on the determined display size;
determining, by the processor, whether to reduce or enlarge the peripheral region and the first and second core regions and whether to change a position of the peripheral region and the first and second core regions based on the determined target size, a priority determined based on whether the peripheral region includes an object associated with the first core region or the second core region, and relevance with the target image; and
transmitting, by the processor, a resized image including the entire first and second core regions and part of the peripheral region based on the obtained target size to the target electronic device, the resized image being resized according to the priority determined based on whether the peripheral region includes an object associated with the first core region or the second core region,
wherein at least one of the first and second core regions is reduced or enlarged based on the determined target size,
wherein the resized image includes at least one of the first and second core regions located at a changed position relative to the original image,
wherein the part of the peripheral region displayed in the resized image is selected based on determining that the part of the peripheral region includes the object that is associated with at least one of the first and second core regions according to the priority and the relevance, and
wherein the part of the peripheral region displayed in the resized image is not selected based on determining that the part of the peripheral region does not include the object that is associated with at least one of the first and second core regions according to the priority and the relevance.

10. The image transmission method of claim 9, wherein transmitting, by the processor, the resized image comprises identifying the first and second core regions from the obtained original image, and selecting part of the peripheral region according to the priority determined based on the first core region or the second core region.

11. The image transmission method of claim 10, wherein the priority is determined based on a distance from the first core region or the second core region.

12. The image transmission method of claim 9, wherein image discontinuity occurs at a border between a resized core region and a resized peripheral region included in the resized image.

13. The image transmission method of claim 9, wherein different resizing ratios are applied to the first and second core regions, and wherein each of the resizing ratios includes a reduction ratio and an expanding ratio.

14. The image transmission method of claim 9, wherein transmitting, by the processor, the resized image comprises resizing the first core region or the second core region, and resizing the peripheral region, wherein different resizing ratios are applied to the first core region or the second core region and the peripheral region, and wherein each of the resizing ratios includes a reduction ratio and an expanding ratio.

15. An electronic device comprising:
a display;
a storage configured to store an original image; and a processor configured to:
display an original image on the display;
receive a target image;
identify a peripheral region and first and second core regions in the original image based on the target image;
determine a target size based on a predetermined criterion to which the original image is resized;
determine whether to reduce or enlarge the peripheral region and the first and second core regions and whether to change a position of the peripheral region and the first and second core regions based on the determined target size, a priority determined based on whether the peripheral region includes an object associated with the first core region or the second core region, and relevance with the target image;
obtain, from the original image stored in the storage, a resized image including the entire first and second core regions and part of the peripheral region; and
display the resized image on the display,
wherein the resized image is resized according to the priority determined based on whether the peripheral region includes an object associated with the first core region or the second core region,
wherein at least one of the first and second core regions is reduced or enlarged based on the determined target size,
wherein the resized image includes at least one of the first and second core regions located at a changed position relative to the original image,
wherein the part of the peripheral region displayed in the resized image is selected based on determining that the part of the peripheral region includes the object that is associated with at least one of the first and second core regions according to the priority and the relevance, and
wherein the part of the peripheral region displayed in the resized image is not selected based on determining that the part of the peripheral region does not include the object that is associated with at least one of the first and second core regions according to the priority and the relevance.

16. An electronic device comprising:
a storage configured to store an original image; and
a processor configured to:
display the original image on the display;
receive a target image;
identify a peripheral region and first and second core regions in the original image based on the target image;
determine a display size of a target electronic device to which the original image stored in the storage is to be transmitted and a target size to which the original image is resized based on the determined display size;
determine whether to reduce or enlarge the peripheral region and the first and second core regions and whether to change a position of the peripheral region and the first and second core regions based on the determined target size, a priority determined based on whether the peripheral region includes an object associated with the first core region or the second core region, and relevance with the target image; and
transmit a resized image including the entire first and second core regions and part of the peripheral region based on the obtained target size to the target electronic device through a communicator,
wherein the resized image is resized according to the priority determined based on whether the peripheral region includes an object associated with the first core region or the second core region,
wherein at least one of the first and second core regions is reduced or enlarged based on the determined target size,
wherein the resized image includes at least one of the first and second core regions located at a changed position relative to the original image,
wherein the part of the peripheral region displayed in the resized image is selected based on determining that the part of the peripheral region includes the object that is associated with at least one of the first and second core regions according to the priority and the relevance, and
wherein the part of the peripheral region displayed in the resized image is not selected based on determining that the part of the peripheral region does not include the object that is associated with at least one of the first and second core regions according to the priority and the relevance.

17. The image resizing method of claim 1, wherein the resized image includes the first core region and the second core region being located a predetermined distance away from each other.

18. The image transmission method of claim 9, wherein the resized image includes the first core region and the second core region being located a predetermined distance away from each other.

19. The electronic device of claim 15, wherein the resized image includes the first core region and the second core region being located a predetermined distance away from each other.

20. The electronic device of claim 16, wherein the resized image includes the first core region and the second core region being located a predetermined distance away from each other.

* * * * *